(12) United States Patent
Mahabadi et al.

(10) Patent No.: US 10,725,470 B2
(45) Date of Patent: Jul. 28, 2020

(54) AUTONOMOUS VEHICLE DRIVING SYSTEMS AND METHODS FOR CRITICAL CONDITIONS

(71) Applicant: GM GLOBAL TECHNOLOGY OPERATIONS LLC, Detroit, MI (US)

(72) Inventors: Seyedalireza Kasaiezadeh Mahabadi, Shelby Township, MI (US); Sayyed Rouhollah Jafari Tafti, Troy, MI (US); Edward T. Heil, Howell, MI (US); Nikolai K. Moshchuk, Grosse Pointe, MI (US); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 164 days.

(21) Appl. No.: 15/621,221

(22) Filed: Jun. 13, 2017

(65) Prior Publication Data

US 2018/0356819 A1  Dec. 13, 2018

(51) Int. Cl.
| | |
|---|---|
| *G05D 1/00* | (2006.01) |
| *B60W 30/08* | (2012.01) |
| *B60W 30/00* | (2006.01) |
| *G05D 1/02* | (2020.01) |
| *G08G 1/16* | (2006.01) |
| *G01C 21/34* | (2006.01) |
| *G08G 1/00* | (2006.01) |

(52) U.S. Cl.
CPC .......... *G05D 1/0088* (2013.01); *B60W 30/00* (2013.01); *B60W 30/08* (2013.01); *G01C 21/3453* (2013.01); *G05D 1/0212* (2013.01); *G05D 1/0217* (2013.01); *G08G 1/166* (2013.01); *G05D 2201/0213* (2013.01); *G08G 1/202* (2013.01)

(58) Field of Classification Search
CPC ... G05D 1/0088; G05D 1/0212; B60W 30/00; G08G 1/16; G01C 21/3453
USPC ...................................................... 701/26, 301
See application file for complete search history.

(56) References Cited

U.S. PATENT DOCUMENTS

| | | |
|---|---|---|
| 8,170,739 B2 | 5/2012 | Lee |
| 8,428,843 B2 | 4/2013 | Lee et al. |
| 8,612,139 B2 | 12/2013 | Wang et al. |
| 8,849,515 B2 | 9/2014 | Moshchuk et al. |
| 9,099,006 B2 | 8/2015 | Mudalige et al. |
| 9,227,632 B1 | 1/2016 | Lee |
| 9,229,453 B1 | 1/2016 | Lee |

(Continued)

FOREIGN PATENT DOCUMENTS

DE   102014016567 A1   5/2016

*Primary Examiner* — Isaac G Smith
(74) *Attorney, Agent, or Firm* — Lorenz & Kopf, LLP

(57) ABSTRACT

A method is provided for autonomously operating a vehicle. The method includes receiving, at a processor, at least vehicle state data and vehicle object environment data; generating, with the processor, an optimal path for the vehicle with a cost function based on the vehicle state data and the vehicle object environment data; identifying, with the processor, at least one critical condition constraint based on at least one of the vehicle or vehicle environment; modifying, with the processor, at least a first portion of the optimal path based on the at least one critical condition constraint to result in a short-range trajectory portion; generating a resulting trajectory with the short-range trajectory portion; and implementing the resulting trajectory on the vehicle.

14 Claims, 12 Drawing Sheets

(56) References Cited

U.S. PATENT DOCUMENTS

| | | | |
|---|---|---|---|
| 2003/0163226 A1* | 8/2003 | Tan | B60T 8/172 |
| | | | 702/1 |
| 2010/0088011 A1* | 4/2010 | Bruce | G01C 21/20 |
| | | | 701/532 |
| 2011/0035150 A1 | 2/2011 | Sundarraj et al. | |
| 2012/0101713 A1 | 4/2012 | Moshchuk et al. | |
| 2013/0032421 A1 | 2/2013 | Bonne et al. | |
| 2013/0035821 A1 | 2/2013 | Bonne et al. | |
| 2013/0054128 A1* | 2/2013 | Moshchuk | G08G 1/167 |
| | | | 701/301 |
| 2014/0244151 A1* | 8/2014 | Matsubara | G08G 1/165 |
| | | | 701/301 |
| 2015/0292894 A1* | 10/2015 | Goddard | G01C 21/3453 |
| | | | 701/400 |
| 2015/0353082 A1 | 12/2015 | Lee et al. | |
| 2015/0353085 A1 | 12/2015 | Lee | |
| 2016/0018229 A1 | 1/2016 | Lee | |
| 2016/0231124 A1 | 8/2016 | Nickolaou et al. | |
| 2016/0313133 A1 | 10/2016 | Zeng et al. | |
| 2016/0375901 A1* | 12/2016 | Di Cairano | B60W 30/09 |
| | | | 701/26 |
| 2017/0235305 A1* | 8/2017 | Jung | B60W 40/072 |
| | | | 701/23 |
| 2017/0236422 A1* | 8/2017 | Naka | G05D 1/0297 |
| | | | 701/301 |
| 2018/0238696 A1* | 8/2018 | Takeda | G01C 21/3676 |

* cited by examiner

AUTONOMOUS VEHICLE DRIVING SYSTEMS AND METHODS FOR CRITICAL CONDITIONS

TECHNICAL FIELD

The present disclosure generally relates to autonomous vehicles, and more particularly relates to systems and methods for trajectory planning in an autonomous vehicle.

BACKGROUND

An autonomous vehicle is a vehicle that is capable of sensing and navigating its environment with little or no user input. Vehicle automation has been categorized into numerical levels ranging from Level Zero, corresponding to no automation with full human control, to Level Five, corresponding to full automation with no human control. Various automated driver-assistance systems, such as cruise control, adaptive cruise control, and parking assistance systems correspond to lower automation levels, while true "driverless" vehicles correspond to higher automation levels. Even though autonomous vehicles have made great advances in recent years, designers continue to seek improvements, particularly with respect to navigation functionality such as trajectory planning.

Accordingly, it is desirable to provide systems and methods that perform improved trajectory planning for autonomous driving systems, particularly systems and methods that addresses various driving environments and conditions. Furthermore, other desirable features and characteristics of the systems and methods will become apparent from the subsequent detailed description and the appended claims, taken in conjunction with the accompanying drawings and the foregoing technical field and background.

SUMMARY

In an exemplary embodiment, a method is provided for autonomously operating a vehicle. The method includes receiving, at a processor, at least vehicle state data and vehicle object environment data; generating, with the processor, an optimal path for the vehicle with a cost function based on the vehicle state data and the vehicle object environment data; identifying, with the processor, at least one critical condition constraint based on at least one of the vehicle or vehicle environment; modifying, with the processor, at least a first portion of the optimal path based on the at least one critical condition constraint to result in a short-range trajectory portion; generating a resulting trajectory with the short-range trajectory portion; and implementing the resulting trajectory on the vehicle.

In another exemplary embodiment, the modifying step includes modifying all of the optimal path based on the at least one critical condition to generate the resulting trajectory.

In a further exemplary embodiment, the method further includes generating a long-range trajectory portion from a second portion of the optimal path without consideration of the at least one critical condition constraint.

In another exemplary embodiment, the step of generating the resulting trajectory includes combining the short-range trajectory portion and the long-range trajectory portion to form the resulting trajectory.

In a further exemplary embodiment, the generating step includes smoothing a first end of the short-range trajectory portion to provide continuity with a second end of the long-range trajectory.

In another exemplary embodiment, the at least one critical condition is associated with unexpected steering input.

In a further exemplary embodiment, the at least one critical condition is associated with slippery road conditions.

In another exemplary embodiment, the at least one critical condition constraint is a safe zone constraint defined around the first portion of the optimal path as an acceptable deviation.

In a further exemplary embodiment, the at least one critical condition constraint is a stability constraint representing lateral motion of the vehicle in terms of side slope angle ($\beta$) and yaw rate ($r=\dot{\varphi}$).

In another exemplary embodiment, the at least one critical condition constraint is an actuator constraint representing a limitation associated with at least one of a steering system, a propulsion system, or a braking system of the vehicle.

In a further exemplary embodiment, the modifying step includes modifying the at least the first portion of the optimal path additionally based on a vehicle dynamics model.

In another exemplary embodiment, the step of generating the optimal path includes additionally receiving driving scenario plan and behavior control data; and generating, with the processor, a search graph based upon the vehicle state data and the driving scenario plan. The search graph contains a grid of points for locating objects relative to a reference trajectory path, and the search graph uses a coordinate system that indicates lateral offsets of the objects relative to the reference trajectory path stations.

In a further exemplary embodiment, the objects include other vehicles in the vehicle environment.

In another exemplary embodiment, the search graph is one of a plurality of search graphs generated using the coordinate system to determine trajectory paths in different road scenarios.

In a further exemplary embodiment, the step of generating the optimal path further includes: generating a local trajectory based upon the trajectory path. The local trajectory is determined based upon satisfying continuity conditions for reaching destination points on the optimal path at different lookahead times, and the local trajectory satisfies kinematic and dynamic constraints of the vehicle and free-space and road boundary constraints of the vehicle environment and is directly used by a longitudinal and lateral controller in the vehicle.

In another exemplary embodiment, an autonomous vehicle includes at least one sensor that provides sensor data about objects within a vehicle environment as vehicle object environment data and about a vehicle state as vehicle state data; and a controller. The controller, with a processor and based on the sensor data, is configured to: generate an optimal path for the vehicle with a cost function based on the vehicle state data and the vehicle object environment data; identify at least one critical condition constraint based on at least one of the vehicle or the vehicle environment; modify at least a first portion of the optimal path based on the at least one critical condition constraint to result in a short-range trajectory portion; generate a resulting trajectory with the short-range trajectory portion; and implement the resulting trajectory with the vehicle.

In a further exemplary embodiment, the controller is configured to generate a long-range trajectory portion from a second portion of the optimal path without consideration of the at least one critical condition constraint and combine the short-range trajectory portion and the long-range trajectory portion to form the resulting trajectory.

In another exemplary embodiment, the controller is configured to smooth a first end of the short-range trajectory portion to provide continuity with a second end of the long-range trajectory portion.

In a further exemplary embodiment, the at least one critical condition is associated with at least one of an unexpected steering input or slippery road conditions, and the at least one critical condition constraint includes a safe zone constraint defined around the first portion of the optimal path as an acceptable deviation, a stability constraint representing lateral motion of the vehicle in terms of side slope angle ($\beta$) and yaw rate ($r=\dot{\varphi}$), or an actuator constraint representing a limitation associated with at least one of a steering system, a propulsion system, or a braking system of the vehicle.

In another exemplary embodiment, an autonomous vehicle system includes at least one sensor that provides sensor data about objects within an environment of a vehicle as vehicle object environment data and about a vehicle state as vehicle state data; and a trajectory control system coupled to the at least one sensor. The trajectory control system includes a trajectory planning system, with a processor and based on the sensor data, configured to: generate an optimal path for the vehicle with a cost function based on the vehicle state data and the vehicle object environment data; identify at least one critical condition constraint based on at least one of the vehicle or the vehicle environment; modify at least a first portion of the optimal path based on the at least one critical condition constraint to result in a short-range trajectory portion; generate a long-range trajectory portion from a second portion of the optimal path without consideration of the at least one critical condition constraint; and generate a resulting trajectory by combining the short-range trajectory portion and the long-range trajectory portion. The trajectory control system further includes a longitudinal and lateral controller coupled to the trajectory planning system and configured to generate commands for vehicle components to implement the resulting trajectory with the vehicle.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
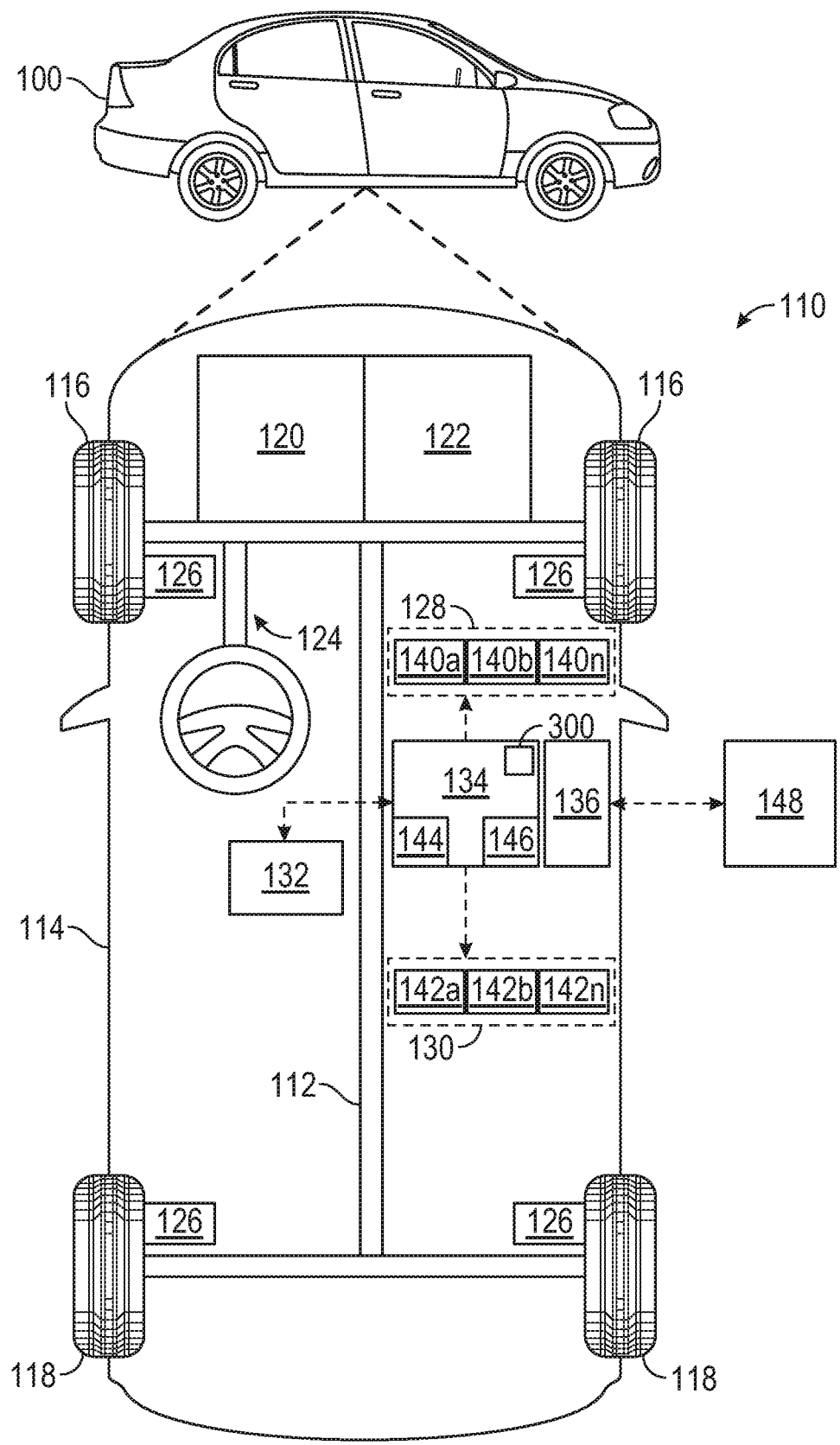
FIG. 1 is a block diagram of an autonomous driving vehicle system in accordance with an exemplary embodiment.

FIG. 1 is a block diagram of an autonomous driving vehicle system 110 implemented in a vehicle 100 in accordance with an exemplary embodiment. In various embodiments, the vehicle 100 is an autonomous vehicle that is automatically controlled to carry passengers from one location to another. In general, the autonomous driving vehicle system 110 includes a trajectory control system 300 that determines and implements a trajectory plan for automated driving, as described in greater detail below. As used herein, the autonomous driving vehicle system 110 refers to the various hardware and software components and systems that enable the vehicle 100 to be operated autonomously and may be considered to include the vehicle 100, as well as cooperating elements outside of the vehicle 100.

The vehicle 100 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 100 may be characterized as Level Four or Level Five automation. Generally, Level Four indicates "high automation", referring to the driving mode-specific performance by an automated driving system of all aspects of the dynamic driving task, even if a human driver does not respond appropriately to a request to intervene; and Level Five indicates "full automation", referring to the full-time performance by an automated driving system of all aspects of the dynamic driving task under all roadway and environmental conditions that can be managed by a human driver.

As depicted in FIG. 1, the vehicle 100 generally includes a chassis 112, a body 114, front wheels 116, and rear wheels 118. The body 114 is arranged on the chassis 112 and substantially encloses components of the vehicle 100. The body 114 and the chassis 112 may jointly form a frame. The wheels 116, 118 are each rotationally coupled to the chassis 112 near a respective corner of the body 114.

As shown, the vehicle 100 generally includes a propulsion system 120, a transmission system 122, a steering system 124, a brake system 126, a sensor system 128, an actuator system 130, at least one data storage device 132, at least one vehicle controller 134, and a communication system 136. Any one or more of these components or aspects thereof may be considered part of the overall autonomous driving vehicle system 110.

The propulsion system 120 may, in various embodiments, include an internal combustion engine, an electric machine such as a traction motor, and/or a fuel cell propulsion system. The transmission system 122 is configured to transmit power from the propulsion system 120 to the vehicle wheels 116, 118 according to selectable speed ratios. According to various embodiments, the transmission system 122 may include a step-ratio automatic transmission, a continuously-variable transmission, or other appropriate transmission. The brake system 126 is configured to provide braking torque to the vehicle wheels 116, 118. The brake system 126 may, in various embodiments, include friction brakes, brake by wire, a regenerative braking system such as an electric machine, and/or other appropriate braking systems. The steering system 124 influences a position of the of the vehicle wheels 116, 118. While depicted as including a steering wheel for illustrative purposes, in some embodiments contemplated within the scope of the present disclosure, the steering system 124 may not include a steering wheel.

The sensor system 128 includes one or more sensing devices 140a-140n that sense observable conditions of the exterior environment and/or the interior environment of the vehicle 100. The sensing devices 140a-140n can include, but are not limited to, radars, lidars, global positioning systems, optical cameras, thermal cameras, ultrasonic sensors, and/or other sensors. The actuator system 130 includes one or more actuator devices 142a-142n that control one or more vehicle features such as, but not limited to, the propulsion system 120, the transmission system 122, the steering system 124, and the brake system 126. In various embodiments, the vehicle features can further include interior and/or exterior vehicle features such as, but are not limited to, doors, a trunk, and cabin features such as air, music, lighting, etc. (not numbered).

The data storage device 132 stores data for use in automatically controlling the vehicle 100. In various embodiments, the data storage device 132 stores defined maps of the navigable environment. In various embodiments, the defined maps may be predefined by and obtained from a remote system (described in further detail with regard to FIG. 2). For example, the defined maps may be assembled by the remote system and communicated to the vehicle 100 (wirelessly and/or in a wired manner) and stored in the data storage device 132. As can be appreciated, the data storage device 132 may be part of the controller 134, separate from the controller 134, or part of the controller 134 and part of a separate system.

The vehicle controller 134 includes at least one processor 144 and a computer readable storage device or media 146. The processor 144 can be any custom made or commercially available processor, a central processing unit (CPU), a graphics processing unit (GPU), an auxiliary processor among several processors associated with the controller 134, a semiconductor based microprocessor (in the form of a microchip or chip set), a macroprocessor, any combination thereof, or generally any device for executing instructions. The computer readable storage device or media 146 may include volatile and nonvolatile storage in read-only memory (ROM), random-access memory (RAM), and keep-alive memory (KAM), for example. KAM is a persistent or non-volatile memory that may be used to store various operating variables while the processor 144 is powered down. The computer-readable storage device or media 146 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 134 in controlling the vehicle 100.

The instructions may include one or more separate programs, each of which comprises an ordered listing of executable instructions for implementing logical functions. The instructions, when executed by the processor 144, receive and process signals from the sensor system 128, perform logic, calculations, methods and/or algorithms for automatically controlling the components of the vehicle 100, and generate control signals to the actuator system 130 to automatically control the components of the vehicle 100 based on the logic, calculations, methods, and/or algorithms. Although only one controller 134 is shown in FIG. 1, embodiments of the autonomous vehicle 100 can include any number of controllers 134 that communicate over any suitable communication medium or a combination of communication mediums and that cooperate to process the sensor signals, perform logic, calculations, methods, and/or algorithms, and generate control signals to automatically control features of the vehicle 100.

In various embodiments, one or more instructions of the controller 134 are embodied in the trajectory control system 300 and, when executed by the processor 144, generates appropriate driving commands that addresses kinematic and dynamic constraints of the environment. For example, the instructions receive as input process sensor and map data. The instructions perform a graph-based approach with a customized cost function to handle different driving scenarios.

Figure 2:
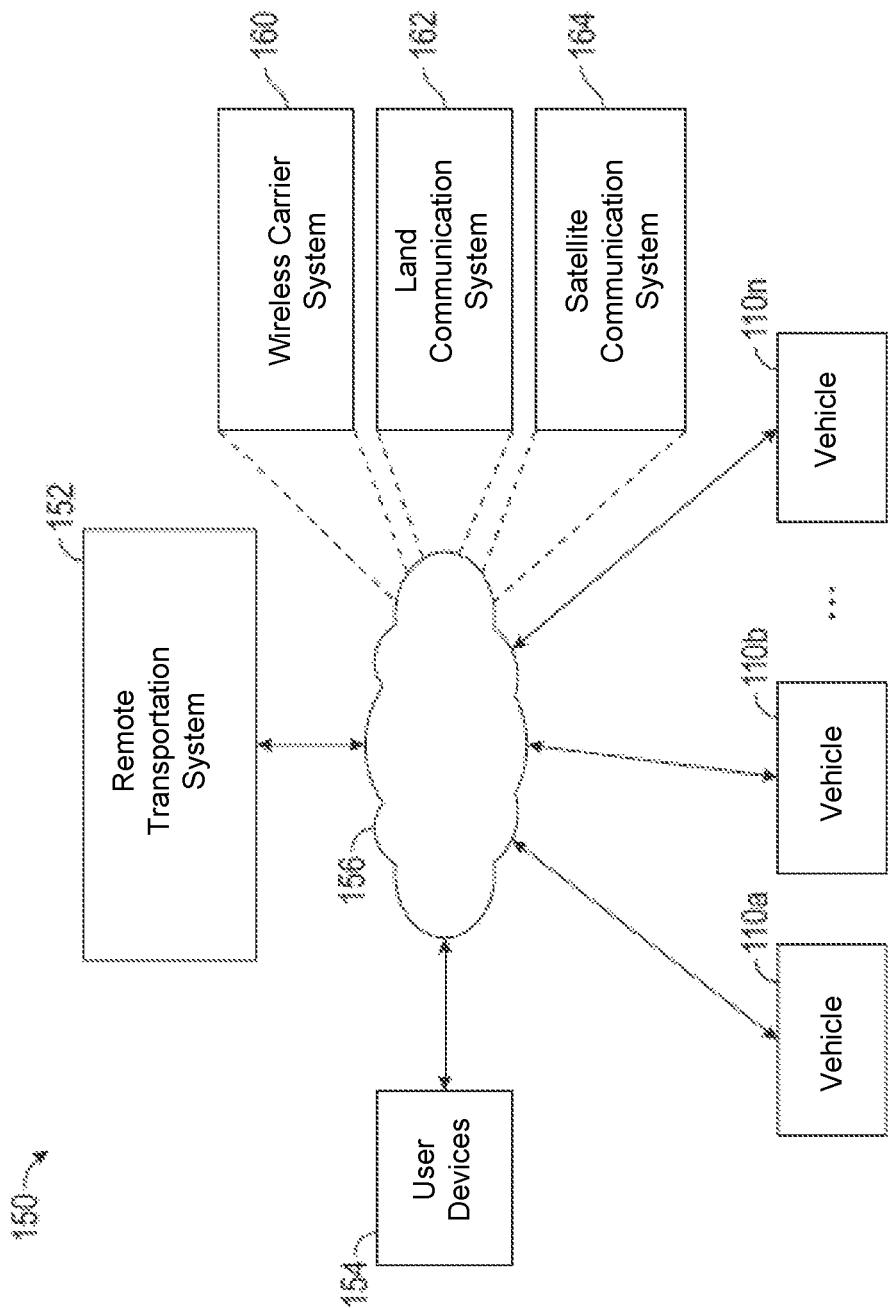
FIG. 2 is a block diagram of a transportation environment in which one or more autonomous vehicles operate in accordance with an exemplary embodiment.

The communication system 136 is configured to wirelessly communicate information to and from other entities 148, such as but not limited to, other vehicles ("V2V" communication), infrastructure ("V2I" communication), remote systems, and/or personal devices (described in more detail with regard to FIG. 2). In an exemplary embodiment, the communication system 136 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

FIG. 2 is a block diagram of a transportation environment 150 in which one or more autonomous vehicles 100a-100n operate in accordance with an exemplary embodiment. In various embodiments, the environment 150 of FIG. 2 may be associated with an autonomous vehicle based remote transportation system 152, such as one suitable for use in the context of a taxi or shuttle system in a certain geographical area (e.g., a city, a school or business campus, a shopping center, an amusement park, an event center, or the like) or one simply be managed by a remote system. Any one or more vehicles 100a-100n depicted in FIG. 2 may correspond to the vehicle 100 of FIG. 1. In other embodiments, the vehicle 100 described herein may be a stand-along vehicle, e.g., not associated with a transportation system or only associated with portions of a transportation system. In various embodiments, the operating environment 150 further includes one or more user devices 154 that communicate with the autonomous vehicle 100 and/or the remote transportation system 152 via a communication network 156.

The communication network 156 supports communication as needed between devices, systems, and components supported by the operating environment 150 (e.g., via tangible communication links and/or wireless communication links). For example, the communication network 156 can include a wireless carrier system 160 such as a cellular telephone system that includes a plurality of cell towers (not shown), one or more mobile switching centers (MSCs) (not shown), as well as any other networking components required to connect the wireless carrier system 160 with a land communications system. Each cell tower includes sending and receiving antennas and a base station, with the base stations from different cell towers being connected to the MSC either directly or via intermediary equipment such as a base station controller. The wireless carrier system 160 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 160. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 160, a second wireless carrier system in the form of a satellite communication system 164 can be included to provide uni-directional or bi-directional communication with the autonomous vehicles 100a-100n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 100 and the station. The satellite telephony can be utilized either in addition to or in lieu of the wireless carrier system 160.

A land communication system 162 may further be included that is a conventional land-based telecommunications network connected to one or more landline telephones and connects the wireless carrier system 160 to the remote transportation system 152. For example, the land communication system 162 may include a public switched telephone network (PSTN) such as that used to provide hard-wired telephony, packet-switched data communications, and the Internet infrastructure. One or more segments of the land communication system 162 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 152 need not be connected via the land communication system 162, but can include wireless telephony equipment so that it can communicate directly with a wireless network, such as the wireless carrier system 160.

Although only one user device 154 is shown in FIG. 2, embodiments of the operating environment 150 can support any number of user devices 154, including multiple user devices 154 owned, operated, or otherwise used by one person. Each user device 154 supported by the operating environment 150 may be implemented using any suitable hardware platform. In this regard, the user device 154 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 154 supported by the operating environment 150 is realized as a computer-implemented or computer-based device having the hardware, software, firmware, and/or processing logic needed to carry out the various techniques and methodologies described herein. For example, the user device 154 includes a microprocessor in the form of a programmable device that includes one or more instructions stored in an internal memory structure and applied to receive binary input to create binary output. In some embodiments, the user device 154 includes a GPS module capable of receiving GPS satellite signals and generating GPS coordinates based on those signals. In other embodiments, the user device 154 includes cellular communications functionality such that the device carries out voice and/or data communications over the communication network 156 using one or more cellular communications protocols, as are discussed herein. In various embodiments, the user device 154 includes a visual display, such as a touch-screen graphical display, or other display.

The remote transportation system 152 may include one or more backend server systems, which may be cloud-based, network-based, or resident at the particular campus or geographical location serviced by the remote transportation system 152. The remote transportation system 152 can be manned by a live advisor, or an automated advisor, or a combination of both. The remote transportation system 152 can communicate with the user devices 154 and the autonomous vehicles 100a-100n to schedule rides, dispatch autonomous vehicles 100a-100n, and the like. In various embodiments, the remote transportation system 152 stores store account information such as subscriber authentication information, vehicle identifiers, profile records, behavioral patterns, and other pertinent subscriber information.

In accordance with a typical use case workflow, a registered user of the remote transportation system 152 can create a ride request via the user device 154. The ride request will typically indicate the passenger's desired pickup location (or current GPS location), the desired destination location (which may identify a predefined vehicle stop and/or a user-specified passenger destination), and a pickup time. The remote transportation system 152 receives the ride request, processes the request, and dispatches a selected one of the autonomous vehicles 100a-100n (when and if one is available) to pick up the passenger at the designated pickup location and at the appropriate time. The transportation system 152 can also generate and send a suitably configured confirmation message or notification to the user device 154 to let the passenger know that a vehicle is on the way.

As can be appreciated, the subject matter disclosed herein provides certain enhanced features and functionality to what may be considered as a standard or baseline autonomous vehicle 100 and/or an autonomous vehicle based remote transportation system 152. To this end, an autonomous vehicle and autonomous vehicle based remote transportation system can be modified, enhanced, or otherwise supplemented to provide the additional features described in more detail below.

As previously noted with respect to FIG. 1, the vehicle 100 and/or vehicle controller 134 may implement a trajectory control system 300 as part of the autonomous driving vehicle system 110. Although depicted as being on-board the vehicle 100 in FIG. 1, portions of the trajectory control system 300 may be located remote from the vehicle 100.

Figure 3:
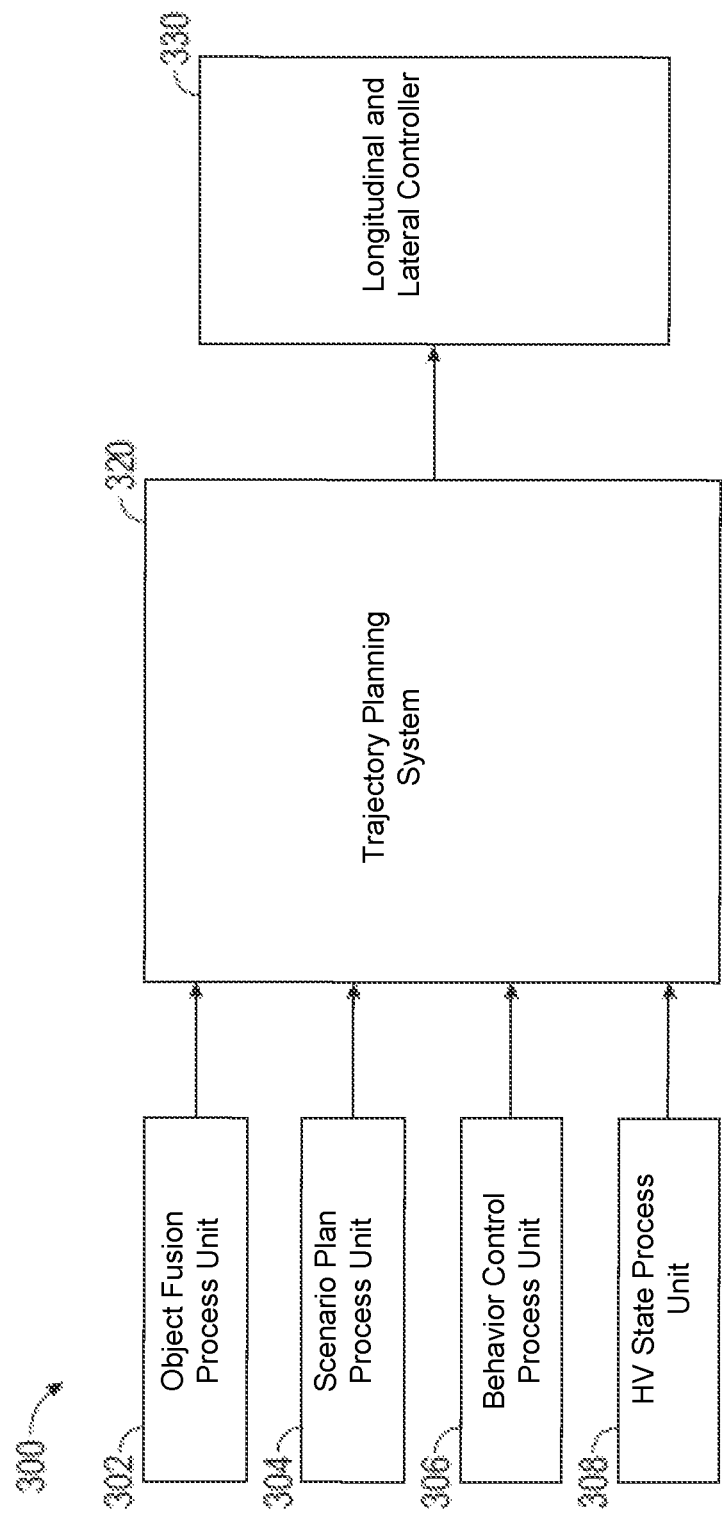
FIG. 3 is a block diagram of a trajectory control system for the autonomous driving vehicle system of FIG. 1 in accordance with an exemplary embodiment.

FIG. 3 is a block or functional diagram of the trajectory control system 300 of FIG. 1 in accordance with an exemplary embodiment. With reference to both FIGS. 1 and 3, various embodiments of the trajectory control system 300 may include any number of units, modules, and sub-modules embedded within the controller 134. As can be appreciated, the elements shown in FIG. 3 can be combined and/or further partitioned to corresponding functions.

In one exemplary embodiment, inputs to the trajectory control system 300 may be received from the sensor system 128, received from other control modules (not shown) associated with the autonomous vehicle 100, received from the communication system 136, and/or determined/modeled by other elements (not shown) within the controller 134. For example, the trajectory control system 300 that may receive host vehicle data, road geometry, map attributes, and remote objects as inputs and generate a collision-free and feasible trajectory for the vehicle to follow in the near future.

As shown in FIG. 3, the trajectory control system 300 may include an object fusion process unit 302 that functions to fuse data from one or more sensors to provide a holistic view of the objects in the environment. The object fusion process unit 302 generates free-space constraints that are provided to a trajectory planning system 320. The free-space constraints from the object fusion process unit 302 may include a list of objects within the environment, such as remote road users and obstacles on the road.

The trajectory control system 300 may further include a scenario plan process unit 304 that provides road boundary constraints to the trajectory planning system 320. The road boundary constraints may be generated in accordance with map data and lane fusion along with a reference trajectory that assumes obstacle-free environments.

The trajectory control system 300 may further include a behavior control process unit 306 that provides high-level behavioral instructions to the trajectory planning system 320. The behavioral instructions may consider all traffic participants and scenarios.

The trajectory control system 300 may further include a host vehicle (HV) state process unit 308 provides position and kinematic constraints for the current state of the host vehicle to the trajectory planning system 320. Use of such input data ensures that the trajectory planning system 320 is provided with a comprehensive understanding of the current scenario.

In general, the trajectory planning system 320 processes the inputs in order to generate a trajectory output that, in one embodiment, satisfies the kinematic and dynamic constraints of the host vehicle as well as the free-space and road boundary constraints of the environment. As described in greater detail below, one or more aspects of the data from the object fusion process unit 302, the scenario plan process unit 304, the behavior control process unit 306, and the host vehicle (HV) state process unit 308 may represent critical conditions associated with the vehicle 100.

In one exemplary embodiment, the trajectory generated by the trajectory planning system 320 includes a list of path waypoints along with a velocity profile for use by a longitudinal and lateral controller 330 in autonomous driving. The longitudinal and lateral controller 330 generates the appropriate commands to the corresponding vehicle components to implement the trajectory. The longitudinal and lateral controller 330 may implement the trajectory in any suitable manner. In one exemplary embodiment, the lateral control associated with the trajectory may include an angle or torque overlay for the steering commands, and the longitudinal control associated with the trajectory may include a velocity and/or acceleration profile with brake system commands and/or accelerator commands. Further details about generating the trajectory with the trajectory planning system 320 are provided below.

Figure 4:
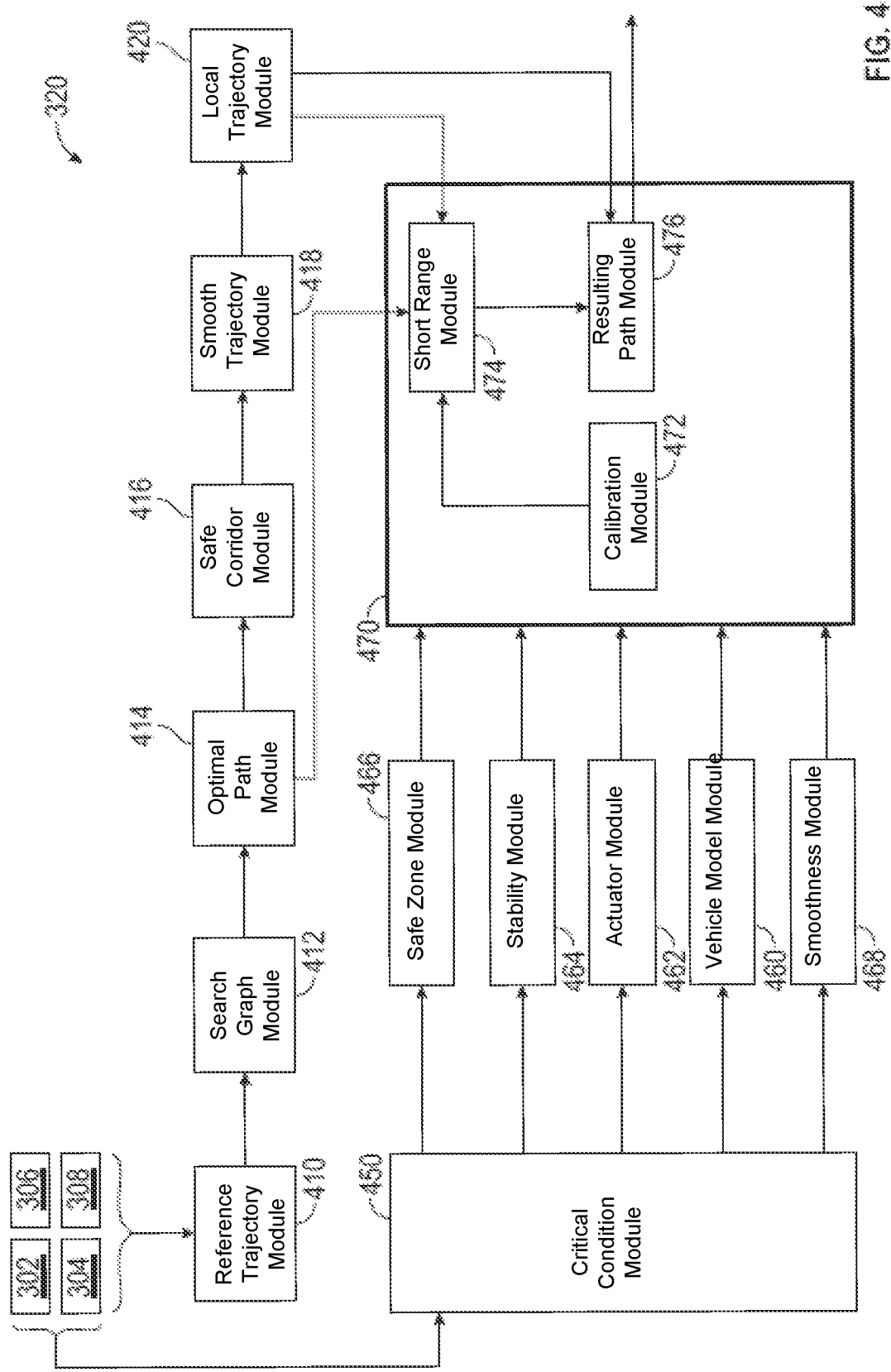
FIG. 4 is a block diagram of a trajectory planning system of the trajectory control system of FIG. 3 in accordance with an exemplary embodiment.

FIG. 4 is a block or functional diagram of the trajectory planning system 320 in accordance with an exemplary embodiment. As above, various embodiments of the trajectory planning system 320 according to the present disclosure can include any number of units, modules, and sub-modules embedded within the controller 134. As can be appreciated, the elements shown in FIG. 4 can be combined and/or further partitioned to perform corresponding functions.

In general, the trajectory planning system 320 may generate the trajectory based on a number of considerations, including different considerations for different aspects of the trajectory. In one exemplary embodiment, the trajectory planning system 320 may generate a first portion of the trajectory over a relatively long-range and a second portion of the trajectory over a relatively short-range. Generally, the terms "long-range" and "short-range" may represent any suitable relative or absolute path planning duration values. As mere non-limiting examples, "short-range" may be considered the next 1, 2, and/or 3 seconds, or a particular percentage (e.g., 10%, 20%, or the like) of the overall path planning duration. In some embodiments, the short-range trajectory portion may correspond to a modified portion of the trajectory that would otherwise be the long-range trajectory portion, although with additional or enhanced considerations. Additional details about determining the relative durations and combining the long-range trajectory portions and the short-range trajectory portions are discussed below. In some embodiments, the trajectory planning system 320 may only generate one of the trajectory portions to represent the trajectory over the entire range. As such, in some exemplary embodiments, one or more of the modules below may be omitted.

As shown in FIG. 4, the trajectory planning system 320 includes a reference trajectory module 410, a search graph module 412, an optimal path module 414, a safe corridor module 416, a smooth trajectory module 418, and a local trajectory module 420. As described in greater detail below, this series of modules 410, 412, 414, 416, 418, 420 may generate the long-range trajectory portion and will be introduced below prior to a more detailed description within the context of the overall resulting trajectory.

The reference trajectory module 410 functions to generate a reference trajectory with the reference trajectory module 410. In particular, the reference trajectory module 410 uses scenario plan data, behavior control data, and host vehicle state data to generate a reference trajectory that assumes no obstacles. The reference trajectory is generated relative to the host vehicle and allows the trajectory planning system 320 to assess where the host vehicle is relative to other obstacles, such as other vehicles.

Figure 5:
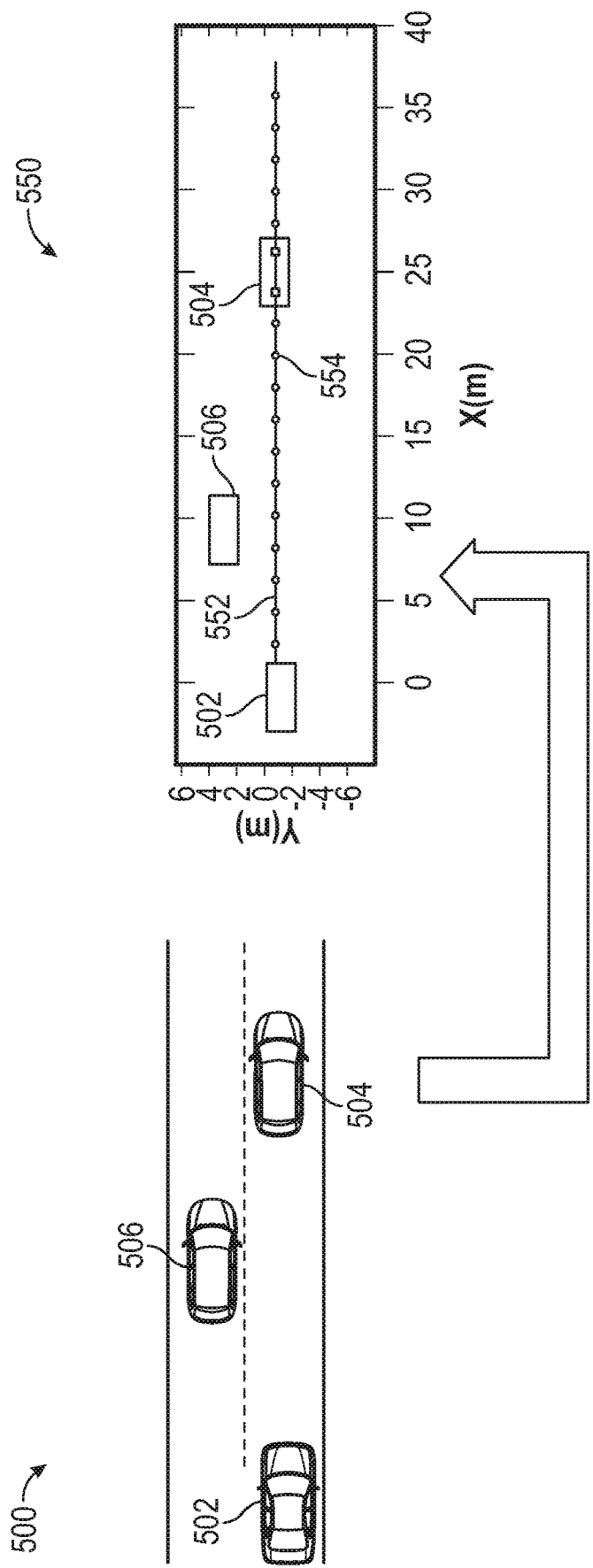
FIGS. 5-8 depict topographical and schematic views of several vehicles including an autonomous host vehicle in accordance with an exemplary embodiment.

Reference is briefly made to FIG. 5, depicts an exemplary topographical view 500 of several vehicles including a host vehicle (HV) 502 and two target vehicles (TVs) 504, 506, and a corresponding schematic view 550 of the generation of a reference trajectory 552. Typically, the host vehicle 502 may correspond to the vehicle implementing the autonomous driving control system 110, e.g., vehicle 100 discussed above.

Referring initially to the topographical view 500 of FIG. 5, the host vehicle 502 is traveling (e.g., in motion) in the right lane. Target vehicles 504, 506 are stopped as indicated (e.g., at 0 km/h). The depicted obstacle environment is described through the data provided by one or more of the scenario planning process unit 304, behavior control process unit 306, and the host vehicle state process unit 308 of FIG. 3.

Referring now to the schematic view 550 of FIG. 5, the reference trajectory 552 includes a reference path (e.g., an initial path to follow) and is generated assuming no obstacles. An X-Y coordinate system is imposed in the schematic view 550 upon the environment to allow the objects in the environment to be numerically positioned along an X-axis and a Y-axis with the host vehicle 502 being positioned at the origin. Both axes in this example are measured in the units of a distance (e.g., meters).

In one embodiment, the trajectory planning system 320 may use another coordinate system to further assess the host vehicle 502 with respect to other objects. The station-lateral (S-L) coordinate system defines objects relative to "station" waypoints along the reference trajectory and how far away "laterally" is an object offset from the reference trajectory 552. Designating objects in this manner relative to the host vehicle 502 may facilitate more difficult driving scenarios, such as sharp curves on the road, intersections, roundabout, U-turns, etc.

Within the S-L coordinate system, the reference trajectory 552 includes a velocity profile at different station waypoints. The velocity profile indicates velocity of the host vehicle 502 at the different waypoints. For example, the velocity profile of the host vehicle 502 at the tenth centerline waypoint station (shown at reference numeral 554) may show a slower velocity at this point versus another station point earlier along the reference trajectory 552 in order to avoid target vehicle 504. In this example, the velocity profile is determined based on one or more factors, such as the target vehicles speed on the road, acceleration/deceleration limits, road speed limits, etc.

Returning to FIG. 4, the reference trajectory module 410 provides the reference trajectory to the search graph module 412. The search graph module 412 uses the generated reference trajectory for generating a search graph. The search graph contains a grid of points that when connected offer various trajectory paths. The points are offset from the reference trajectory. Objects are associated with certain points on the grid to indicate the degree of lateral offset that an obstacle has with respect to the reference trajectory.

Figure 6:
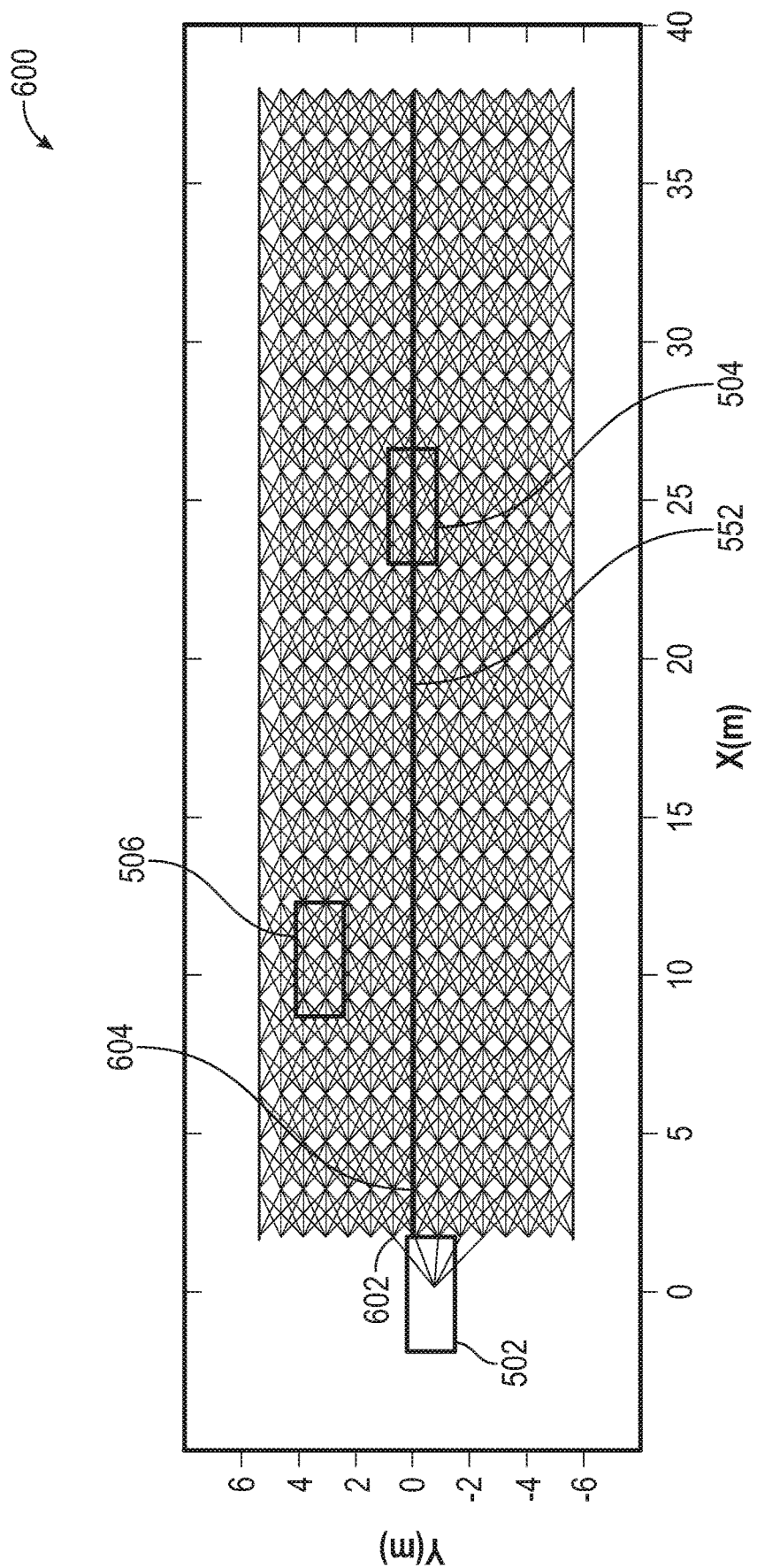

Reference is briefly made to FIG. 6, which depicts the generation of a search graph 600 by the search graph module 412 and continues the example introduced by FIG. 5. The search graph 600 contains nodes that are offset in the lateral direction from the centerline waypoint stations. Line segments connect a node to its neighboring nodes. For example, node 602 is connected via a line segment to neighboring node 604. In general, each node is assumed to have the same velocity as its corresponding reference trajectory point.

Returning to FIG. 4, the search graph module 412 provides the search graph to the optimal path module 414. The optimal path module 414 further receives the free-space constraints from the object fusion process unit 302 and generates an optimal path. In one exemplary embodiment, the optimal path corresponds to an ideal or optimal path through the subject environment in view of to the various constraints described above. For performing the optimization, optimal path module 414 includes a cost function that accounts for one or more factors related to collision avoidance with static and dynamic objects on the road, degree of offset from the reference directory, and/or further considerations. Additional details are discussed below, including details regarding modifications of the optimal path in view of critical conditions.

Figure 7:
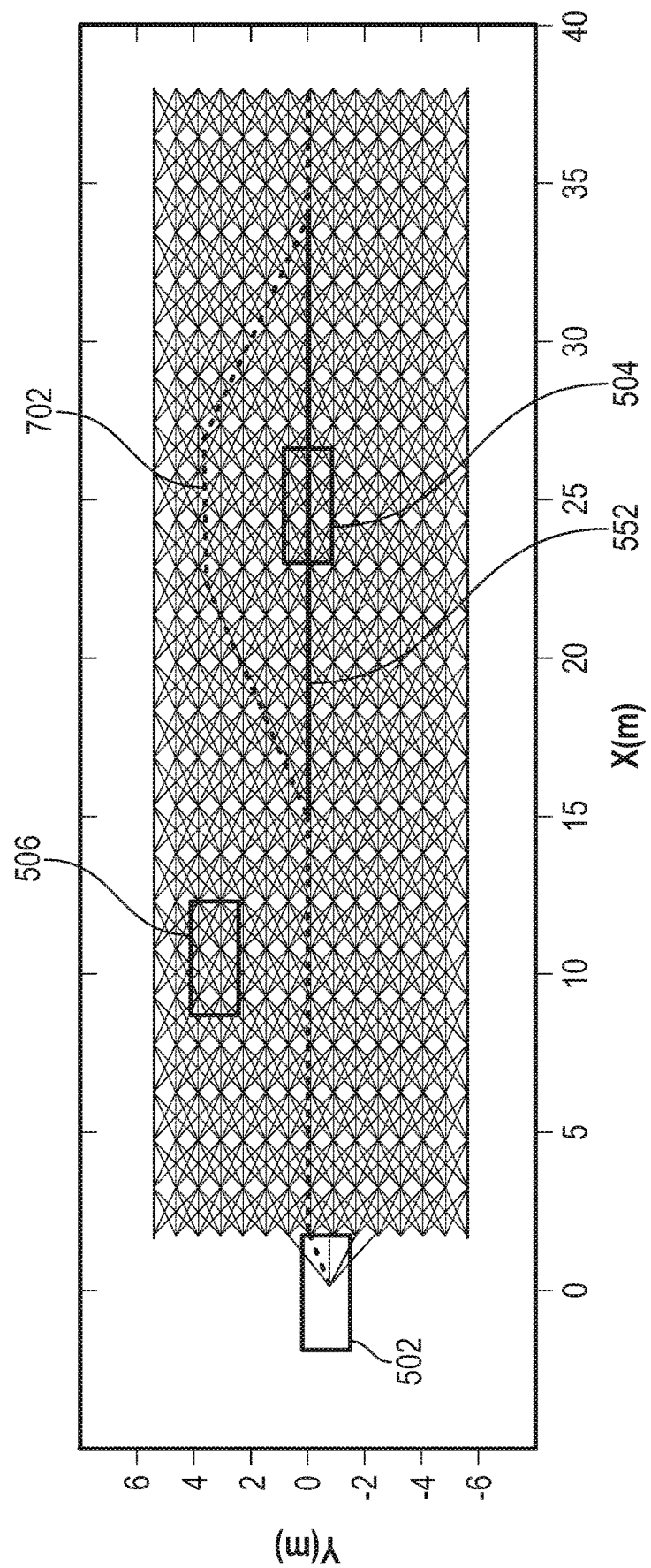

Reference is briefly made to FIG. 7, which depicts the generation of an optimal path 702 by the optimal path module 414 and continues the example of FIGS. 5 and 6. The optimal path 702 is one that best reaches a desired destination given the constraints and environmental factors. The optimization approach uses a cost function to help identify a path 702 through the nodes that is optimal with respect to one or more driving factors. These factors may include a cost associated with possible collision with static and dynamic objects on the road; degree of offset from reference trajectory; required steering action; degree of deviation from the previously generated trajectory; etc. The following Expression (1) provides an example of a cost function for each path through the search graph:

$$D_i = \sum_j \left( \alpha_L \frac{D_{ij}^o}{D_{max}^o} + \alpha_s \frac{D_{ij}^s}{D_{max}^s} + \alpha_d \frac{D_{ij}^d}{D_{max}^d} + \alpha_p \frac{D_{ij}^p}{D_{max}^p} \right) \quad \text{Expression (1)}$$

wherein, $D_{ij}^o$ represents offset from the reference trajectory;

$D_{ij}^s$ represents steering action cost;

$D_{ij}^d$ represents offset of the segments from the previous planned trajectory;

$D_{ij}^p$ represents virtual potential field values to keep the path away from obstacles;

$D_{ij}^P$: represents proximity of shifted targets (e.g., with a value is infinity if shifted targets are within a close region of the host vehicle but otherwise zero);

α: represents values tuned to meet specific driving and performance requirements such as HV dynamic constraints, driver comfortless, safety, eco-driving; and $D_{max}$ represents values elected to normalize distance costs to [0 1] range As an illustration of the cost function in FIG. 7, the path 702 for host vehicle 502 has the lowest cost because of the avoidance of the various objects within the environment.

Returning to FIG. 4, the safe corridor module 416 functions to designate a safe corridor around the optimal path for avoiding collision with other objects. The smooth trajectory module 418 functions to smooth the optimal path through the safe corridor. Curve smoothing operations are performed to reduce extent of curvature and curvature rate. The local trajectory module 420 further refines the smoothed trajectory path by generating a local trajectory that satisfies certain criteria for reaching the desired destination point. Such criteria can include trajectory duration, offset trajectory, etc. As noted above, the trajectory from the local trajectory module 420 may be considered the long-range trajectory portion, which is provided to the critical control module 470.

Figure 8:
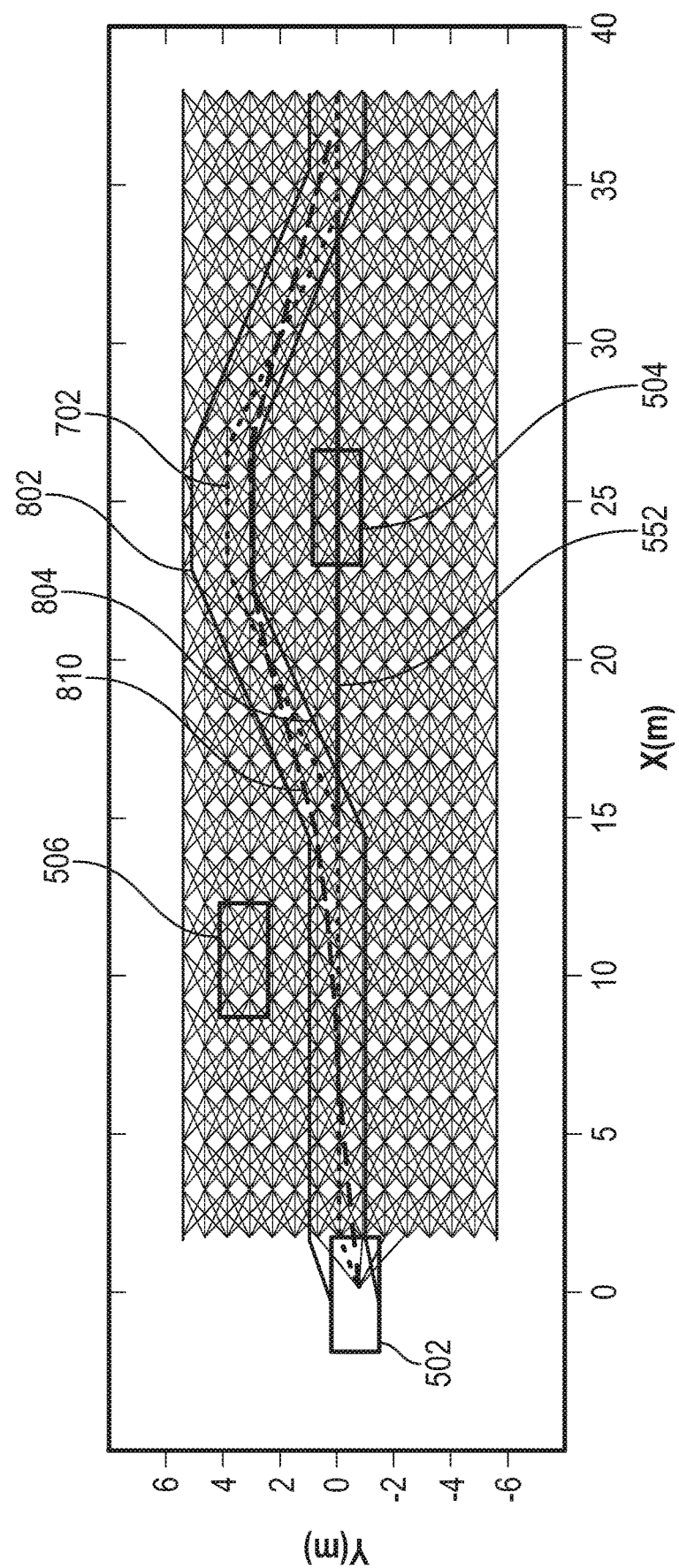

Reference is briefly made to FIG. 8, which depicts the determination of a safe corridor, represented by lines 802, 804 that bound the optimal path 702. The safe corridor 802, 804 defines the range within which subsequently refined pathways can vary in a safe manner. More specifically, safe corridor 802, 804 are connecting points on both sides of the optimal path 702 that are at safe distances from all surrounding obstacles.

FIG. 8 further depicts a smooth trajectory 810 generated by smooth trajectory module 418. The smooth trajectory 810 is a path within the safe corridor 802, 804 with minimal curvature and curvature rate. This avoids, among other things, maximum lateral acceleration/jerk driving experience. FIG. 8 further depicts a local trajectory 702 generated by local trajectory module 420. Multiple trajectories satisfying continuity conditions are planned to reach destination points on the smoothed trajectory at different lookahead times. Local trajectory differs from the smooth trajectory in that it satisfies kinematic constraints, such as continuity in position, heading, curvature and velocity, for the host vehicle. The local trajectory 702 can be determined based upon one or more of the following cost items: trajectory duration; offset from smooth trajectory; maximum lateral acceleration; and collision possibility. By adding the local trajectory processing, these constraints can be satisfied for the host vehicle.

Returning to FIG. 4 and as introduced above, the resulting trajectory generated by the trajectory planning system 320 may include one or more of a long-range trajectory portion and a short-range trajectory portion. In one embodiment, the local trajectory generated by the smooth trajectory module 420 may represent the long-range trajectory portion provided to the critical control module 470, discussed in greater below. Generation of the short-range trajectory portion will now be discussed.

As shown in FIG. 4, the trajectory planning system 320 further includes a critical condition module 450 that receives various types of input data. The critical condition module 450 evaluates this data and identifies the existence and/or characteristics of critical conditions. In this context, critical conditions may refer to any vehicle, driving, and/or environmental condition that may impact the vehicle, particularly a condition that may compromise the long-range trajectory portion discussed above. Such conditions may include, as examples, slippery road conditions or unexpected obstacles that necessitate an excessive steering maneuver.

The critical conditions may be detected and/or characterized in any suitable manner. For example, unexpected steering inputs may be derived from sensors associated with the steering system 124, e.g., from sensed parameters that indicate force on the steering wheel in an unexpected direction or at an unexpected rate. Slippery road conditions may be identified and/or characterized by estimating a surface friction coefficient. The surface friction coefficient may be determined based on weather or condition information received from the communication network 156 and/or derived according to location. Further information about the surface friction coefficient may be derived from sensor data (e.g., from visual or infrared cameras, lidar, etc.) based on a number of factors, including actions from surrounding vehicles, temperature, humidity, wind speed, wind direction, precipitation, sun load, tire pressure changes, speed or acceleration deviations, road surface (e.g., gravel, wet asphalt, snow, ice, etc.), or the like. Another example for critical condition is fog that may limit a visibility range. Vision systems as well as other perception tools may be used to detect the visible range. Unexpected appearance of obstacles such an animal that suddenly leaps into the roadway may necessitate excessive steering. This condition may take the vehicle into a nonlinear range of operation that is otherwise not considered in typical path planning, thereby presenting an additional type of critical condition that may be accommodated by exemplary embodiments discussed herein.

The trajectory planning system 320 further includes a vehicle model module 460, an actuator module 462, a stability module 464, and a safe zone module 466. The critical condition module 450 provides the critical condition characteristics to these modules 460, 462, 464, 466.

Generally, the vehicle model module 460 receives the various types of input data associated with the vehicle, including the tires. The vehicle model module 460 represents a collection of equations, algorithm, or models that represent the vehicle dynamics. In one exemplary embodiment, the vehicle model module 460 is a bicycle model with a nonlinear tire modal. In one embodiment, the critical condition characteristics may be used by the vehicle model, for example, for modeling and/or as constraints.

In one exemplary embodiment, the model of the vehicle model module 460 may be standard system dynamics ($\dot{x}$) represented by a function of the vehicle state vector (X) and one or more control actions (u). The vehicle state vector (X) and one or more control actions (u) are may be represented by the following Expressions (2) and (3):

$$X = [x, y, \psi, \beta, \dot{\psi}, v_x, a_x] \qquad \text{Expression (2)}$$

wherein, x, y represent position coordinates;

ψ represents the yaw;

β represents the side slip angle;

$\dot{\psi}$ represents the yaw rate;

$v_x$ represents the longitudinal vehicle velocity; and $a_x$ represents the longitudinal acceleration.

$$u = [\delta_{rf}, a_{xd}] \qquad \text{Expression (3).}$$

wherein, $\delta_{rf}$ represents the road steering angle on the front axle; and $a_{xd}$ represents the desired longitudinal acceleration.

The system dynamics ($\dot{x}$) may be represented by the following Expression (4):

$$\dot{x} = f(x, u) = \begin{bmatrix} v_x(\cos(\psi + \beta)) \\ v_x(\sin(\psi + \beta)) \\ \dot{\psi} \\ \dfrac{F_{yf} + F_{yr}}{mv_x} - \dot{\psi} \\ \dfrac{F_{yf}L_f + F_{yr}L_r}{I_z} \\ a_x \\ \dfrac{(a_{xd} - a_x)}{\tau_d} \end{bmatrix} \quad \text{Expression (4)}$$

wherein,

ψ and β represent yaw and side slip angles;

$F_{yf}$ and $F_{yr}$ represent lateral tire forces for front and rear axles, which may be expanded based on vehicle states and tire lateral stiffness;

$\dot{\psi}$ represents yaw rate;

$\tau_d$ represents powertrain or brake system time constants;

$L_f$ and $L_r$ represent distances from the front and rear axle to the center of gravity;

$v_x$ represents longitudinal vehicle velocity;

$I_z$ represents the yaw moment inertia; and m represents the vehicle mass.

The vehicle model module 460 provides the representations of vehicle dynamics to the critical control module 470, as discussed in greater detail below.

The actuator module 462 generates or defines the constraints associated with the actuators as one type of critical condition constraint. Such constraints may be based on models and limitations associated with the actuators and may be considered in view of the critical condition characteristics provided by the critical condition module 450. In one example, the constraints may depend on actuator bandwidth and a safe normal range for actuator action. Any vehicle actuator may be subject to the constraints in the actuator module 462.

As an example, constraints associated with a steering range and steering rate limit may be respectively represented by the following Expressions (5) and (6):

$$\delta^{min} < \delta < \delta^{max} \quad \text{Expression (5)}$$

$$\dot{\delta}^{min} < \dot{\delta} < \dot{\delta}^{max} \quad \text{Expression (6)}$$

As a further example, constraints associated with the powertrain and brake system as constraints on tractive and braking force may be represented by the following Expression (7):

$$a_x^{min} < a_x < a_x^{max} \quad \text{Expression (7)}$$

Figure 9:
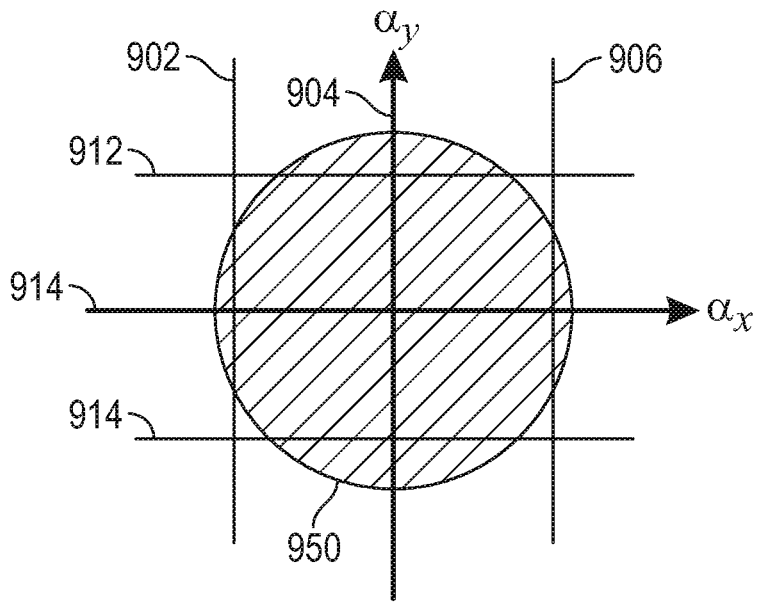
FIG. 9 is a graphical representation of actuator constraints that may be implemented in the trajectory planning system of FIG. 4 in accordance with an exemplary embodiment.

Reference is briefly made to FIG. 9, which is a graphical representation of the actuator constraints on an acceleration (or "g-g") diagram 900. In which vertical lines 902, 904, 906 represent acceleration values associated with the tractive and braking forces and horizontal lines 912, 914, 916 represent acceleration values associated with steering system. As depicted in the diagram, the steering system is generally associated with lateral acceleration ($a_y$) and the powertrain and brake systems are generally associated with longitudinal acceleration ($a_x$). The resulting acceleration constraints 950 are graphically represented on the diagram 900 in the lateral and longitudinal directions.

Accordingly, the actuator module 462 and/or vehicle model module 460 utilize the critical condition characteristics for modeling and/or real time adaptation of constraints. For example, the critical condition characteristics may be used as road conditions in vehicle (or tire) model and/or as constraints in the control strategy, discussed in greater detail below. Examples include the maximum deceleration based on road conditions or a visibility range to determine the maximum speed. A further example of a critical condition constraint is the steering input that may occur when an obstacle (e.g., an animal) enters the roadway, which may impact steering rate and angle as constraints on avoiding the obstacle.

Returning to FIG. 4, the stability module 464 generates or defines a stable envelope for lateral motion of the vehicle that may be represented as in terms of side slope angle (β) and yaw rate (r=$\dot{\varphi}$) as further types of critical condition constraints, which may be respectively expressed as Expressions (8) and (9):

$$\beta^{min} < \beta < \beta^{max} \quad \text{Expression (8)}$$

$$r^{min} < r < r^{max} \quad \text{Expression (9)}$$

Figure 10:
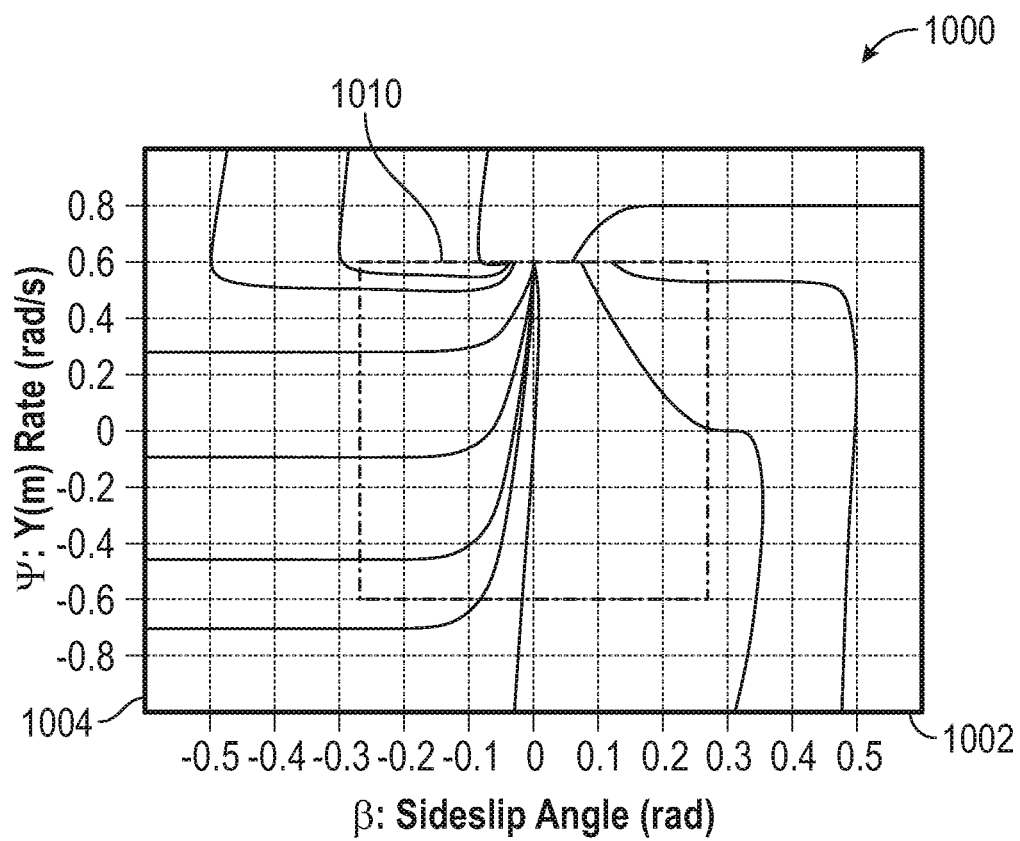
FIG. 10 is a graphical representation of stability constraints that may be implemented in the trajectory planning system of FIG. 4 in accordance with an exemplary embodiment.

Reference is briefly made to FIG. 10 in which the stability constraint (or stable envelope) is represented as a side slip angle-yaw rate (β-r) phase portrait 1000. In FIG. 10, the side slip angle values are represented on a horizontal axis 1002 and the yaw rate values are represented on the vertical axis 1004. The resulting constraint 1010 is represented.

In effect, the phase portion 1000 of FIG. 10 depicts the stable region for vehicle motions (or states), including yaw rate and side slip angle. In other words, the constraints associated with the stability module 464 enables the vehicles states to remain inside the defined envelope of side slip angle and yaw rate. The size of this envelope may depend on the critical condition characteristics, including road conditions, as well as vehicle velocity and vehicle characteristics. In the control module 470, discussed below, this constraint may be represented mathematically to facilitate vehicle stability under different road conditions.

Returning to FIG. 4, the safe zone module 466 functions to generate safe zone constraints as another type of critical condition constraint that represent boundaries defined around the optimal path at each point considering the critical conditions, such as slippery roads resulting from environmental conditions, as discussed in greater detail below. In one example, the safe zone module 466 may represent boundary constraints defined according to vehicle positions.

The smoothness module 468 defines curvature constraints for the vehicle 100 in view of the critical condition characteristics as another type of critical condition constraint. Such constraints may be defined as constraint on the extent of curvature and/or curvature rate.

The critical control module 470 receives the constraints from the smoothness module 468, safe zone module 466, the stability module 464, and the actuator module 462; the vehicle dynamic equations from the vehicle model module 460; and the optimal path from the optimal path module 414. Generally, the critical control module 470 functions to modify the optimal path in view of the critical conditions (e.g., at least partially represented by the constraints) to provide a more effective trajectory, as will now be described in greater detail.

The critical control module 470 may be considered to include a calibration sub-module 472, a short-range sub-module 474, and a resulting path sub-module 476. Generally, the calibration sub-module 472 functions to define relative durations of the short-range trajectory portion and the long-range trajectory portion. The relative durations may be dependent on a number of issues, including the available processing resources, urgency of the critical conditions, and the like. In some embodiments, the relative durations may be a predetermined constant. Further, in other embodiments, the entire resulting trajectory may be the short-range trajectory portion described herein.

Figure 11:
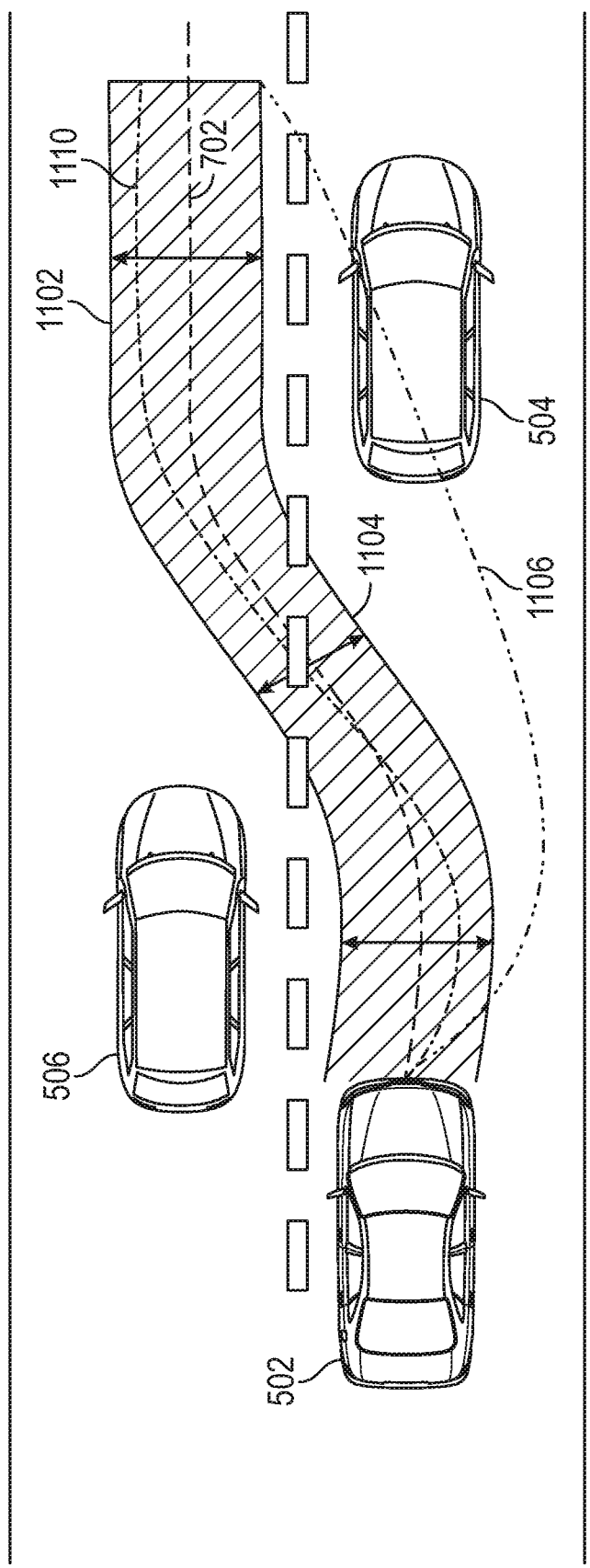
FIG. 11 is a graphical representation of a modified optimal path that may be implemented in the trajectory planning system of FIG. 4 in accordance with an exemplary embodiment.

The short-range sub-module 474 functions to generate the short-range trajectory portion based on the duration defined by the calibration sub-module 472. Reference is briefly made to FIG. 11, which is a schematic representation generally corresponding to the example of FIG. 5. As above, the host vehicle 502 is traveling on a road with target vehicles 504, 506. The optimal path 702 (e.g., without consideration for the critical conditions) is provided around the target vehicles 504, 506.

The representation in FIG. 11 also depicts the safe zone boundaries 1102, 1104 defined around the optimal path 702. As noted above, the safe zone boundaries 1102, 1104 correspond to the safe zone constraints provided by the safe zone module 466. In effect, the safe zone boundaries 1102, 1104 define and/or predict the amount of deviation from the optimal path 702 that is tolerable in view of safe zone constraints.

In the scenario of FIG. 11, if the vehicle 502 attempts to follow the optimal path 702 under the critical conditions, the commands may result in an undesirable resulting path 1106 (e.g., since the optimal path 702 may not accommodate and/or consider the critical conditions). As such, the critical control module 470 generates a feasible trajectory 1110 for the critical conditions that maintains the vehicle 502 within the safe zone boundaries 1102, 1104. In effect, the critical control module 470 modifies the optimal path 702 to result in the feasible trajectory 1110 in view of the critical conditions, thereby providing a safe trajectory for the vehicle 502. The feasible trajectory 1110 may correspond to an unsmoothed short-range trajectory portion.

Returning to FIG. 4, the short-range sub-module 474 may generate the short-range trajectory portion in any suitable manner. In one exemplary embodiment, the short-range sub-module 474 utilizes model predictive control (MPC) techniques. MPC is a method of process control that relies on multivariable dynamic models of complex systems. For example, the MPC used by the short-range sub-module 474 may be an iterative, finite-horizon optimization of the vehicle path in which the current state is sampled and a cost minimizing control strategy is computed to modify the optimal path while complying with the constraints represented by the critical conditions. As the control strategy is implemented, a prediction horizon is shifted forward, thereby yielding new control and predicted state paths. In this manner, the short-range sub-module 474 functions to track the current state and path of the vehicle in order to incorporate the critical conditions into generation and planning of the short-range trajectory portion.

One example of MPC implementation is provided below. Typically, MPC systems attempt to move a predicted future output of control signals (y) over a control horizon (M) of a prediction horizon towards a target control signal ($y_d$) subject to constraints (e.g., constraints based on the critical condition characteristics). An optimizer generates the control input signals based on state variables and a prediction model generates the resulting predicted control input signals. The prediction function may be implemented with any systematic technique to predict system behavior over the prediction horizon, including recursive and batch methods.

Similarly, the constrained optimization may be implemented in any technique that is solved in real time, such as an active set technique.

As an example, Expression (10) is a general formulation of a linear parameter varying (LPV) system, which a form of a linear time varying dynamic model.

$$\dot{\xi} = A\xi + B\vartheta + C \qquad \text{Expression (10)}$$

wherein,
$\xi$ represents the state variables;
$\vartheta$ represents the control input signals; and
A, B and, C represent a continuous time dependent system, control, and known disturbance matrices at time t.

The state variables may be estimated or measured, e.g., (y=E$\xi$).

The prediction model may undergo discretization to provide a recursive form at sampling time (t), as represented by Expression (11).

$$\xi_{t+1} = \overline{A}\xi_t + \overline{B}\vartheta_t + \overline{C} \qquad \text{Expression (11)}$$

The objective function for the optimizer may be represented by Expression (12).

$$J^*_{MPC} = \min_{V(t)} \sum_{k=1}^{k=N_p} \|\xi_{t+k|t} - \xi_{des_{t+k|t}}\|_L^2 + \sum_{k=0}^{k=N_c-1} \|\vartheta_{t+k|t}\|_R^2 \qquad \text{Expression (12)}$$

wherein,
$\xi$ represents the actual state; and
$\xi_{des}$ represents the desired state.

As such, the objective function seeks to minimize the error between the actual state the desired state while minimizing control actions over the prediction horizon.

The objective function is subject to the dynamic model of the system (Expression (13)), constraints associated with the state (Expression (14)), and constraints associated with the control actions (Expression (15)).

$$\xi_{k+1|t} = \overline{A}\xi_{k|t} + \overline{B}\vartheta_{k|t} + \overline{C} \qquad \text{Expression (13)}$$

$$\xi_{k|t} \in X \ k=t+1, \ldots \ t+N_p \qquad \text{Expression (14)}$$

$$v_{k|t} \in V \ k=t+1, \ldots \ t+N_c-1 \qquad \text{Expression (15)}$$

A more specific representation of an associated dynamic model is provided above in Expression (4). The critical condition constraints discussed above may be incorporated into Expressions (14) and (15). For example, the actuator constraints from module 462 may be considered in Expression (15). As further examples, the safe zone constraints, stability constraints, and curvature constraints from modules 464, 466, 468 may be considered in Expression (14).

As introduced above, the result of the objective function provides optimized control signals, such as control signals for the steering and braking systems, as examples.

Returning to FIG. 4, the short-range sub-module 474 provides the short-range trajectory portion to the resulting path sub-module 476. The resulting path sub-module 476 also receives the long-range trajectory portion, described above. Generally, the resulting path sub-module 476 functions to combine the short-range trajectory portion with the long-range trajectory portion to generate the resulting trajectory.

In one exemplary embodiment, the resulting path sub-module 476 evaluates the end of the short-range trajectory portion with the beginning of the long-range trajectory portion to determine if the combined portions are subject to a discontinuity and/or inappropriate transition, and if so, smoothes the short-range path portion until the discontinuity and/or inappropriate transition no longer exists, as represented by the following Expression (16):

If $X_f^- \neq X_f^+$; or $\dot{X}_f^- \neq \dot{X}_f^+$, then $X_f^- = X_f^+$; and $\dot{X}_f^- = \dot{X}_f^+$     Expression (16)

wherein,
$X_f^-$ represents the state vector function of the end of the short-range trajectory portion;
$X_f^+$ represents the state vector function of the start of the long-range trajectory portion;
$\dot{X}_f^-$ represents the dynamic function of the end of the short-range trajectory portion; and
$\dot{X}_f^+$ represents the dynamic function of the start of the long-range trajectory portion.

The resulting path sub-module 476 may smooth the short-range trajectory portion in accordance with predetermined curvature constraints and/or curvature constraints based on the critical conditions. Upon combining the short-range trajectory portion and the long-range trajectory portion, the critical control module provides the resulting trajectory to the longitudinal and lateral controller 330 of the vehicle for implementing the trajectory. Because of the inputs and processing depicted in FIG. 4, the trajectory output satisfies the kinematic and dynamic constraints of the host vehicle and free-space and road boundary constraints of the environment in view of the critical conditions.

Figure 12:
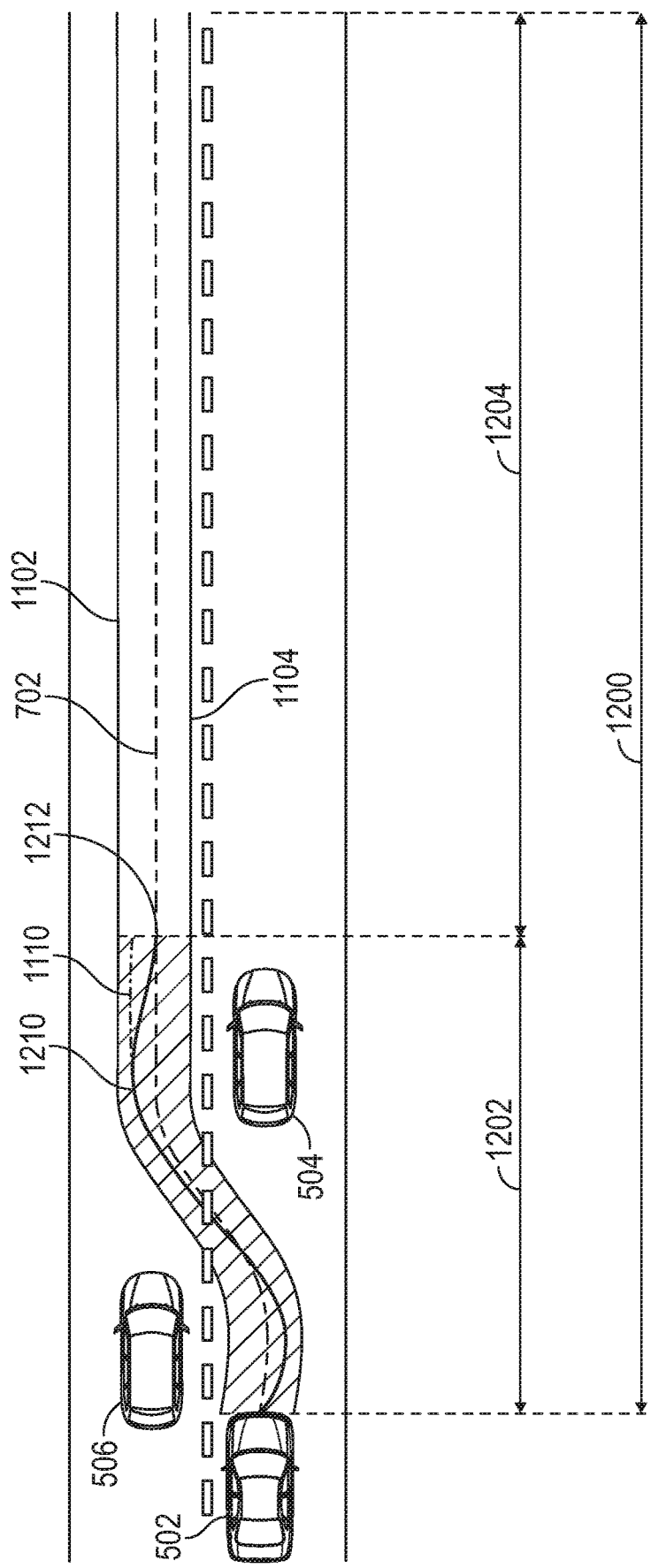
FIG. 12 is a graphical representation of a resulting trajectory that may be implemented in the trajectory planning system of FIG. 4 in accordance with an exemplary embodiment.

Reference is briefly made to FIG. 12, which is a graphical representation of a resulting trajectory 1212 that may be generated by the trajectory planning system 470 of FIG. 4. As above, FIG. 12 depicts the host vehicle 502 and the feasible trajectory 1110 generated in view of the optimal path 702 around target vehicles 504, 506. As shown in FIG. 12, the feasible path 1110 has a discontinuity with respect to the optimal path 702. As noted above, the smooth sub-module 476 functions to smooth the feasible trajectory 1110 to result in the short-range trajectory portion 1210. The combination of the short-range trajectory portion 1210 within a short-range duration 1202 and the optimal path 702 within the long-range duration 1204 provides a resulting trajectory over the entire duration 1200.

Figure 13:
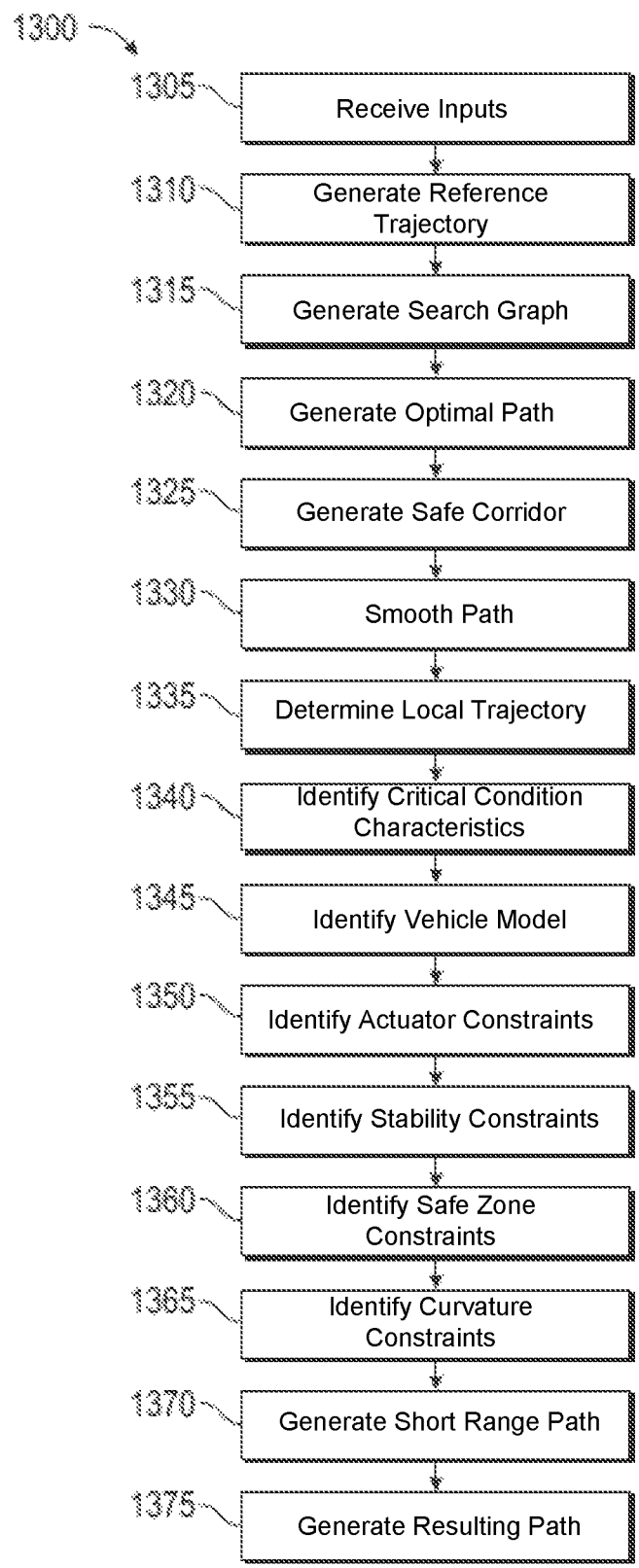
FIG. 13 is a flowchart illustrating an operational scenario for controlling the autonomous host vehicle in accordance with an exemplary embodiment.

FIG. 13 depicts a flowchart illustrating an operational scenario for a trajectory planning method 1300. As can be appreciated in light of the disclosure, the order of operation within the method 1300 is not limited to the sequential execution as illustrated in FIG. 13, but may be performed in one or more varying orders as applicable and in accordance with the present disclosure. In various embodiments, the method 1300 can be scheduled to run based on one or more predetermined events, and/or can run continuously during operation of the autonomous vehicle.

In a first step 1305 of method 1500, the trajectory control system 300 receives input from various sensors and control modules. In step 1310, a reference trajectory is generated. In step 1315, a search graph is generated for the reference trajectory. In step 1320, an optimal path is generated for the search graph and reference trajectory. In steps 1325 and 1330, a safe corridor is generated for the optimal path and subsequently smoothed. In step 1335, a local trajectory is determined for the smoothed trajectory to generate the long range path. In step 1340, the critical condition characteristics are identified from the input data. In step 1345, a vehicle model is identified and/or retrieved. In steps 1350, 1355, 1360, and 1365, actuator constraints, stability constraints, safe zone constraints, and curvature constraints are identified for the critical condition characteristics. In step 1370, a short range path is generated from the optimal path, the critical condition constraints, and the vehicle model. In step 1375, a resulting path with associated actuator commands is generated from the long range path and the short range path.

The operational scenario depicted in FIG. 13 includes a trajectory planning method that is computationally efficient through its geometric approach and also generic as it can be used in a wide range of road scenarios including during critical conditions. Additionally, the planning method of the operational scenario is reactive to changes in the host vehicle dynamics as well as in other dynamic objects on the roads. The resulting trajectory in this operational scenario follows the rules of traffic, is safe within the road boundaries, and considers host vehicle non-holonomic motion constraints as well as dynamic constraints such as maximum lateral acceleration/jerk. The operational scenario in FIG. 13 can be configured with a vast number of variations.

Additional details about generating a trajectory in accordance with exemplary embodiments, particularly with respect to generating a smooth trajectory within the safe corridor with minimal curvature and curvature rate may be provided in U.S. patent application Ser. No. 15/347,546 filed Nov. 9, 2016 and incorporated herein by reference.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:
1. A method for autonomously operating a vehicle, the method comprising:
    generating, by a processor, a search graph based on a reference trajectory, wherein the search graph includes a plurality of nodes that are offset in a lateral direction from centerline waypoint stations, and line segments that connect each node of the plurality of nodes to neighboring nodes;
    generating, by the processor, a first path for the vehicle based on a cost function and the search graph, wherein the cost function is associated with possible collisions with static and dynamic objects on a road, a degree of offset from the reference trajectory, a required steering action, a degree of deviation from a previously generated trajectory;
    generating, by the processor, a first trajectory based on the first path and a corridor, the corridor defines points associated with the first path and that represent safe distances from obstacles;
    identifying, by the processor, at least one constraint;
    modifying, by the processor, at least a first portion of the first trajectory using model predictive control that takes into account the at least one constraint to result in a second trajectory, wherein the portion is defined based on a pre-defined duration;

generating a resulting trajectory based on the first trajectory and the second trajectory; and controlling the vehicle based on the resulting trajectory.

2. The method of claim 1 wherein the generating the resulting trajectory includes combining the first trajectory and the second trajectory, by smoothing an ending of the second trajectory with a beginning of the first trajectory to form the resulting trajectory.

3. The method of claim 1, wherein the at least one constraint is a safe zone constraint defined around the first portion of the first trajectory as an acceptable deviation.

4. The method of claim 1, wherein the at least one constraint is a stability constraint representing lateral motion of the vehicle in terms of side slope angle ($\beta$) and yaw rate ($r=\dot\varphi$).

5. The method of claim 1, wherein the at least one constraint is an actuator constraint representing a limitation associated with at least one of a steering system, a propulsion system, or a braking system of the vehicle.

6. The method of claim 1, wherein the at least one constraint is based on a vehicle dynamics model.

7. The method of claim 1, and wherein the search graph uses a coordinate system that indicates lateral offsets of objects relative to the reference trajectory.

8. The method of claim 7, wherein the objects include other vehicles in the vehicle environment.

9. The method of claim 8, wherein the search graph is one of a plurality of search graphs generated using the coordinate system to determine trajectory paths in different road scenarios.

10. An autonomous vehicle, comprising:

at least one sensor that provides sensor data about objects within a vehicle environment as vehicle object environment data and about a vehicle state as vehicle state data; and a controller that, by a processor and based on the sensor data, is configured to:
  generate, a search graph based on a reference trajectory, wherein the search graph includes a plurality of nodes that are offset in a lateral direction from centerline waypoint stations, and line segments that connect each node of the plurality of nodes to neighboring nodes;
  generate a first path for the vehicle based on a cost function and the search graph, wherein the cost function is associated with possible collisions with static and dynamic objects on a road, a degree of offset from the reference trajectory, a required steering action, a degree of deviation from a previously generated trajectory;
  generate a first trajectory based on the first path and a corridor, the corridor defines points associated with the first path and that represent safe distances from obstacles;
  identify at least one critical condition constraint based on at least one of the vehicle or the vehicle environment;
  modify at least a first portion of the first trajectory using model predictive control that takes into account the at least one critical condition constraint to result in a second trajectory, wherein the first portion is defined based on a pre-defined duration;
  generate a resulting trajectory based on the first trajectory and the second trajectory; and
  control the vehicle based on the resulting trajectory.

11. The autonomous vehicle of claim 10, wherein the controller is configured to generate the first trajectory without consideration of the at least one critical condition constraint.

12. The autonomous vehicle of claim 11, wherein the controller is configured to smooth a first end of the second trajectory to provide continuity with a second end of the first trajectory.

13. The autonomous vehicle of claim 12, wherein the at least one critical condition constraint includes a safe zone constraint defined around the first portion of the first trajectory as an acceptable deviation, a stability constraint representing lateral motion of the vehicle in terms of side slope angle ($\beta$) and yaw rate ($r=\dot\varphi$), or an actuator constraint representing a limitation associated with at least one of a steering system, a propulsion system, or a braking system of the vehicle.

14. The method of claim 1, wherein the model predictive control includes a linear parameter varying system.

* * * * *